US009182012B2

(12) United States Patent
Greiss et al.

(10) Patent No.: US 9,182,012 B2
(45) Date of Patent: Nov. 10, 2015

(54) POWER TRANSFER UNIT

(75) Inventors: Bernd Greiss, Oakland Township, MI (US); Austin R. Gerding, Royal Oak, MI (US); Jason Bock, Sterling Heights, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 102 days.

(21) Appl. No.: 14/110,371

(22) PCT Filed: Apr. 20, 2012

(86) PCT No.: PCT/US2012/034371
§ 371 (c)(1),
(2), (4) Date: Oct. 7, 2013

(87) PCT Pub. No.: WO2012/145580
PCT Pub. Date: Oct. 26, 2012

(65) Prior Publication Data
US 2014/0020490 A1    Jan. 23, 2014

Related U.S. Application Data

(60) Provisional application No. 61/477,570, filed on Apr. 20, 2011.

(51) Int. Cl.
*F16D 11/14*    (2006.01)
*F16H 3/22*    (2006.01)
(Continued)

(52) U.S. Cl.
CPC ............... *F16H 3/22* (2013.01); *B60K 17/344* (2013.01); *B60K 17/348* (2013.01); *B60K 23/08* (2013.01); *B60K 2023/0858* (2013.01); *Y10T 74/19614* (2015.01)

(58) Field of Classification Search
None
See application file for complete search history.

(56) References Cited

U.S. PATENT DOCUMENTS 3,414,100 A    12/1968  Spencer
3,753,479 A *   8/1973  Williams ............... 192/69.43
(Continued)

FOREIGN PATENT DOCUMENTS

DE    3801351 A1    8/1989
DE    3822518 A1    1/1990
(Continued)

OTHER PUBLICATIONS

EP Extended Search Report for EP Application No. 12774177.5 dated Oct. 28, 2014, (5 pages).
(Continued)

*Primary Examiner* — Rodney H Bonck
(74) *Attorney, Agent, or Firm* — Jennifer M. Brumbaugh; Reising Ethington P.C.

(57) ABSTRACT

A power transfer unit for transferring a torque comprising a first shaft configured to receive the torque from a first device, a second shaft configured to output the torque to a second device, and an activating assembly for selectively transferring the torque from the first shaft to the second shaft. The activating assembly includes a sliding cam, a rotating cam, an actuator configured to selectively rotate the rotating cam relative to the sliding cam, and an engaging gear. The gear is configured to be moved by the sliding cam between a first engaged position where the torque is transferred from the first shaft to the second shaft through the gear and a second disengaged position where no torque is transferred to the second shaft. Relative rotation between the rotating earn and the sliding cam moves the sliding earn thereby moving the gear between the first engaged and second disengaged position.

18 Claims, 5 Drawing Sheets

(51) Int. Cl.
  *B60K 17/344* (2006.01)
  *B60K 17/348* (2006.01)
  *B60K 23/08* (2006.01)

(56) References Cited

U.S. PATENT DOCUMENTS

| | | |
|---|---|---|
| 3,831,462 A | 8/1974 | Baremor |
| 4,269,294 A | 5/1981 | Kelbel |
| 4,381,828 A | 5/1983 | Lunn et al. |
| 4,632,207 A | 12/1986 | Moore |
| 4,651,592 A | 3/1987 | Edwards |
| 4,684,000 A | 8/1987 | Brown |
| 4,696,382 A | 9/1987 | Aho |
| 4,776,441 A * | 10/1988 | Kagata et al. .............. 192/69.42 |
| 4,811,824 A * | 3/1989 | Kurihara ......................... 192/35 |
| 4,867,921 A | 9/1989 | Steketee, Jr. |
| 4,915,190 A | 4/1990 | Iwata |
| 5,016,724 A | 5/1991 | Steinhagen et al. |
| 5,046,576 A | 9/1991 | Miyawaki |
| 5,085,305 A * | 2/1992 | Cheng .......................... 192/69.82 |
| 5,086,867 A | 2/1992 | Hirota et al. |
| 5,103,690 A * | 4/1992 | Macpherson et al. ... 74/665 GB |
| 5,105,901 A | 4/1992 | Watanabe et al. |
| 5,105,902 A | 4/1992 | Wilson et al. |
| 5,119,900 A | 6/1992 | Watanabe et al. |
| 5,307,965 A | 5/1994 | Worrel |
| 5,407,024 A | 4/1995 | Watson et al. |
| 5,411,110 A | 5/1995 | Wilson et al. |
| 5,462,496 A | 10/1995 | Dick et al. |
| 5,465,819 A * | 11/1995 | Weilant et al. .................. 192/35 |
| 5,465,820 A | 11/1995 | Dick |
| 5,485,894 A | 1/1996 | Watson et al. |
| 5,562,566 A | 10/1996 | Yang |
| 5,584,776 A | 12/1996 | Weilant et al. |
| 5,609,219 A | 3/1997 | Watson et al. |
| 5,908,080 A | 6/1999 | Bigley et al. |
| 5,934,430 A | 8/1999 | Kolomeitsev et al. |
| 5,951,428 A | 9/1999 | Itoh et al. |
| 5,954,150 A | 9/1999 | Miller et al. |
| 6,000,488 A | 12/1999 | Atkinson |
| 6,062,330 A | 5/2000 | Watson et al. |
| 6,079,539 A | 6/2000 | Fetcho et al. |
| 6,113,512 A | 9/2000 | Williams |
| 6,152,827 A | 11/2000 | Muller et al. |
| 6,263,995 B1 | 7/2001 | Watson et al. |
| 6,296,590 B1 | 10/2001 | Gassmann |
| 6,540,640 B2 | 4/2003 | Hibbler et al. |
| 6,592,487 B2 | 7/2003 | Gassmann |
| 6,598,721 B2 | 7/2003 | Schmidl |
| 6,644,428 B2 | 11/2003 | Gady et al. |
| 6,709,357 B2 | 3/2004 | Schleuder et al. |
| 6,725,990 B2 | 4/2004 | Bowen |
| 6,805,653 B2 | 10/2004 | Krzesicki et al. |
| 6,814,682 B2 | 11/2004 | Spitale |
| 6,824,487 B2 | 11/2004 | Williams et al. |
| 6,848,550 B2 | 2/2005 | Puiu et al. |
| 6,862,953 B2 | 3/2005 | Fitzgerald et al. |
| 6,875,146 B2 | 4/2005 | Bansbach et al. |
| 6,929,577 B2 | 8/2005 | Mueller et al. |
| 6,938,748 B2 | 9/2005 | Pennycuff |
| 6,964,315 B2 | 11/2005 | Mueller |
| 6,966,863 B2 | 11/2005 | Teraoka et al. |
| 6,966,864 B2 | 11/2005 | Williams et al. |
| 6,969,334 B2 | 11/2005 | Schleuder et al. |
| 6,974,400 B2 | 12/2005 | Williams |
| 6,997,299 B2 | 2/2006 | Brissenden et al. |
| 7,004,873 B2 | 2/2006 | Puiu |
| 7,011,596 B2 | 3/2006 | Haka |
| 7,033,300 B2 | 4/2006 | Mueller et al. |
| 7,081,064 B2 | 7/2006 | Mueller et al. |
| 7,083,030 B2 | 8/2006 | Dolan |
| 7,086,515 B2 | 8/2006 | Kelley, Jr. et al. |
| 7,096,990 B2 | 8/2006 | Borgen et al. |
| 7,101,304 B2 | 9/2006 | Swanson et al. |
| 7,111,716 B2 | 9/2006 | Ekonen et al. |
| 7,150,694 B2 | 12/2006 | Mizon et al. |
| 7,175,557 B2 | 2/2007 | Kirkwood et al. |
| 7,175,558 B2 | 2/2007 | Puiu et al. |
| 7,178,652 B2 | 2/2007 | Mueller |
| 7,188,017 B2 | 3/2007 | Rodrigues et al. |
| 7,189,179 B2 | 3/2007 | Williams et al. |
| 7,207,409 B2 | 4/2007 | Downs |
| 7,229,378 B2 | 6/2007 | Mueller et al. |
| 7,254,471 B2 | 8/2007 | Allen et al. |
| 7,258,213 B2 | 8/2007 | Ekonen et al. |
| 7,278,946 B2 | 10/2007 | Williams et al. |
| 7,281,617 B2 | 10/2007 | Puiu |
| 7,294,086 B2 | 11/2007 | Brissenden et al. |
| 7,331,896 B1 | 2/2008 | Kroppe |
| 7,337,886 B2 | 3/2008 | Puiu |
| 7,377,871 B2 | 5/2008 | Bowen |
| 7,399,251 B2 | 7/2008 | Mueller et al. |
| 7,485,063 B2 | 2/2009 | Nett et al. |
| 7,491,145 B2 | 2/2009 | Mizon et al. |
| 7,527,133 B2 | 5/2009 | Sachsenmaier et al. |
| 7,533,754 B2 | 5/2009 | Burrows et al. |
| 7,546,914 B2 | 6/2009 | Schranz et al. |
| 7,553,251 B2 | 6/2009 | Nett et al. |
| 7,611,414 B2 | 11/2009 | Mueller et al. |
| 7,611,441 B2 | 11/2009 | Cring |
| 7,635,055 B2 | 12/2009 | Ekonen et al. |
| 7,686,149 B2 | 3/2010 | Sachsenmaier et al. |
| 7,694,598 B2 | 4/2010 | Kriebernegg et al. |
| 7,694,793 B2 | 4/2010 | Wittkopp et al. |
| 7,895,913 B2 | 3/2011 | Mizon et al. |
| 7,922,615 B2 | 4/2011 | Mizon et al. |
| 8,042,642 B2 | 10/2011 | Marsh et al. |
| 8,047,323 B2 | 11/2011 | Downs et al. |
| 8,443,954 B2 | 5/2013 | Quehenberger et al. |
| 2001/0011622 A1 | 8/2001 | Arai et al. |
| 2002/0074202 A1 | 6/2002 | Schmidl |
| 2007/0023249 A1 | 2/2007 | Schranz et al. |
| 2007/0095628 A1 | 5/2007 | Niederbacher |
| 2007/0289797 A1 | 12/2007 | Bowen |
| 2008/0234091 A1 | 9/2008 | Ronk et al. |
| 2009/0235780 A1 | 9/2009 | Zink |
| 2010/0094519 A1 | 4/2010 | Quehenberger et al. |
| 2010/0122884 A1 | 5/2010 | Mizon et al. |
| 2010/0200352 A1 | 8/2010 | Williams |

FOREIGN PATENT DOCUMENTS

| | | |
|---|---|---|
| DE | 10010709 A1 | 9/2001 |
| DE | 10103789 A1 | 9/2001 |
| DE | 10160951 A1 | 7/2002 |
| DE | 102005021460 A1 | 11/2006 |
| DE | 102005021633 A1 | 11/2006 |
| DE | 102006017693 A1 | 11/2006 |
| DE | 102006024941 A1 | 3/2007 |
| DE | 102006043330 A1 | 4/2007 |
| DE | 101008010458 A1 | 9/2008 |
| DE | 102008044791 A1 | 4/2009 |
| EP | 1533169 A2 | 5/2005 |
| JP | 60135327 A | 7/1985 |
| JP | 2003287103 | 10/2003 |
| KR | 2019990020807 U | 6/1999 |
| KR | 100274035 B1 | 12/2000 |
| KR | 100483163 B1 | 4/2005 |
| WO | 2005/073602 A1 | 8/2005 |
| WO | 2006/128637 A1 | 12/2006 |
| WO | 2008/027224 A2 | 3/2008 |

OTHER PUBLICATIONS

JP Office Action for JP Application No. 2014-506561 dated Aug. 4, 2015, (3 pages).

* cited by examiner

POWER TRANSFER UNIT

CROSS-REFERENCE TO RELATED PATENT APPLICATIONS

This application claims the benefit and priority to U.S. Provisional Patent Application No. 61/477,570, filed Apr. 20, 2012. U.S. Provisional Patent Application No. 61/477,570 is incorporated by reference herein in its entirety.

TECHNICAL FIELD

The present application relates generally to the field of drive trains for motor vehicles. More specifically, the present application relates to a power transfer unit for use in a drive train system to selectively provide driving torque to the rear wheels, wherein the power transfer unit is activated and deactivated by a cam assembly, which can tailor the activation and deactivation cycles to optimize speed and efficiency.

BACKGROUND

In some motor vehicles (more commonly in trucks and sport utility vehicles), it has been known to have a drive train which provides switchable four-wheel drive. These systems typically have the rear wheels continuously driven by torque from the propshaft, which is driven by the transmission. These systems tend to have user-switchable four-wheel drive, such that the user through a lever (e.g., shifter, switch) engages a transfer case that redistributes a portion of the torque from the rear wheels to the front wheels. These systems are primarily designed to operate during low traction conditions, such as slippery conditions created by snow or off-road type conditions.

In other motor vehicles (more commonly in passenger cars, such as sedans), it has been known to have a drive train that provides all wheel drive (AWD). These systems typically have one set of wheels (typically the front wheels) driven by torque from the transmission and, as required, torque is redistributed to the other set of wheels (typically the rear wheels), by actuation of a clutch system. This redistribution of torque may be automatically transferred by the vehicle when it determines that the front wheels have angular velocities that differ by a predetermined amount from the angular velocities of the rear wheels, which indicates slippage of the front wheels created by torque exceeding traction. When the vehicle determines this difference in angular velocities between wheels, it engages the clutch mechanism, which couples a driveshaft to the operating power train system that redistributes some of the torque generated through the power train to the rear wheels. This system reduces the torque driven to the slipping wheels to a point to achieve traction again, and redistributes the reduced torque to the non-slipping wheels.

It would be advantageous to have a drive train system that provides driver selectable AWD capability by redistributing torque more efficiently (i.e., less power loss). It would also be advantageous to have an AWD drive train system that may be produced at a lower cost and with greater reliability than conventional AVID systems.

SUMMARY

One embodiment relates to a power transfer unit for use in a vehicle for transferring a torque. The power transfer unit includes a first shaft configured to receive the torque from a first device, a second shaft configured to output the torque to a second device, and an activating assembly for selectively transferring the torque from the first shaft to the second shaft. The activating assembly includes a sliding cam, a rotating cam, an actuator configured to selectively rotate the rotating cam relative to the sliding cam, and a movable gear. The gear is configured to be moved by the sliding cam between a first engaged position where the torque is transferred from the first shaft to the second shaft through the gear and a second disengaged position where no torque is transferred to the second shaft. Relative rotation between the rotating cam and the sliding cam moves the sliding cam thereby moving the gear between the first engaged and second disengaged positions.

DETAILED DESCRIPTION

With general reference to the Figures, disclosed herein are power transfer units for use in power train or drive train systems of vehicles for transferring propulsion power, such as from a front set of drive wheels to a rear set of drive wheels. The power transfer units disclosed herein may include a first shaft or input shaft configured to receive a torque, a second shaft or disconnect shaft configured to output the torque, and an activating assembly for selectively transferring the torque from the first shaft to the second shaft by coupling/decoupling the second shaft to/from the first shaft. The activating assembly may include a movable gear, a sliding cam, a rotating cam, and an actuator configured to selectively rotate the rotating cam relative to the sliding cam. The gear may be configured to be moved or slid by the sliding cam between a first engaged position and a second disengaged position. In the first engaged position, the torque is transferred from the first shaft to the second shaft through the movable gear. In the second disengaged position, the torque is not transferred to the second shaft, in other words, no torque is transferred to the second shaft from the first shaft in the disengaged position of the gear. Further, relative rotation between the rotating cam and the sliding cam may move the sliding cam to thereby move the gear between the first engaged and second disengaged positions.

Figure 1:
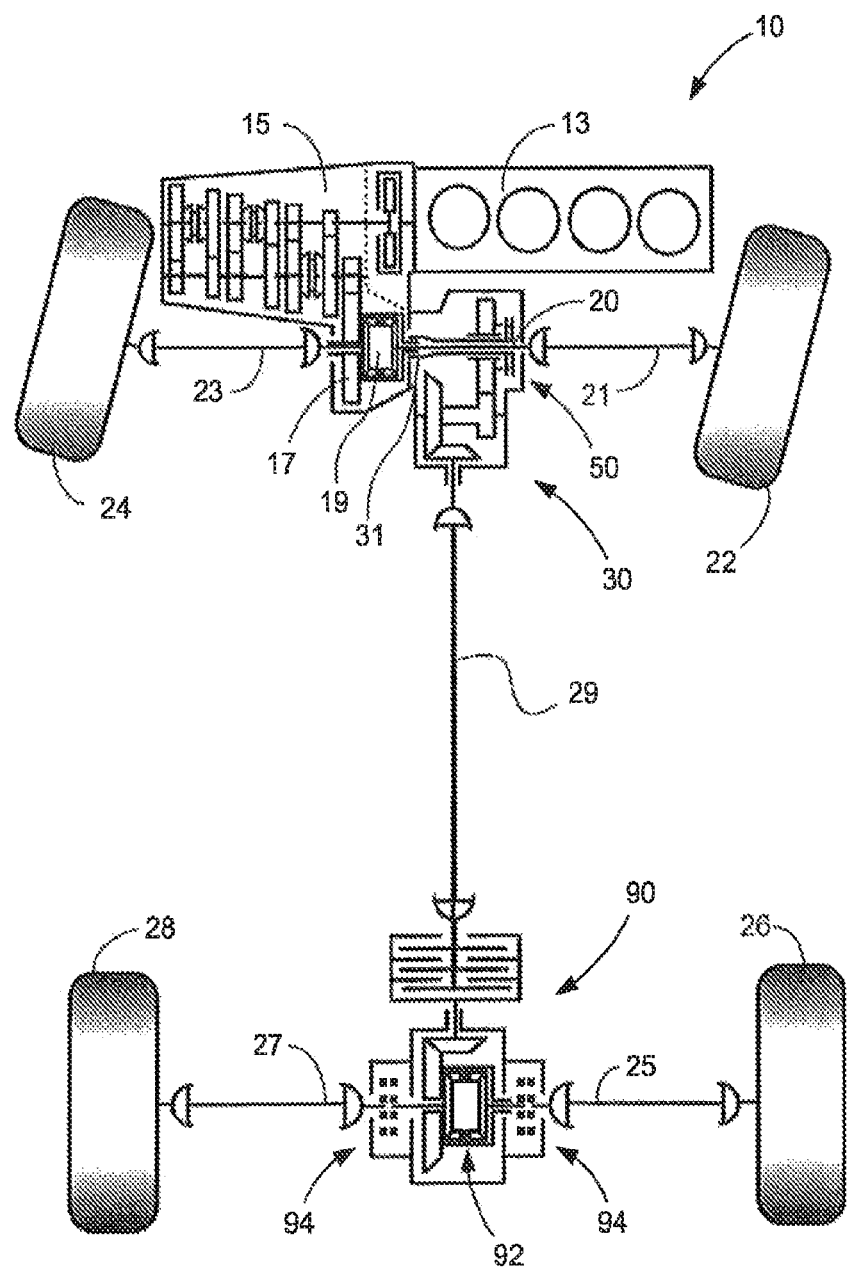
FIG. 1 is a top schematic view of a drive train system according to an exemplary embodiment.

FIG. 1 illustrates a power train or drive train system 10 that is configured for use in a motor vehicle and provides the propulsion power to propel or move the vehicle. According to an exemplary embodiment, the drive train system 10 includes an engine 13, a transmission 15, a final drive unit 17, a front differential assembly 19, a first (or front right) driveshaft 21, a second (or front left) driveshaft 23, a third (or rear right) driveshaft 25, a fourth (or rear left) driveshaft 27, a first (or front right) wheel 22, a second (or front left) wheel 24, a third (or rear right) wheel 26, a fourth (or rear left) wheel 28, a propshaft 29, a power transfer unit 30, and a rear drive unit 90. The engine 13 may be mounted transversely or in-line longitudinally down the vehicle, and is configured to provide output power and torque to the transmission 15, which is configured to provide power and torque as required to the final drive unit 17. The final drive unit 17 is configured to provide power and torque into the front differential assembly 19, where the final drive unit 17 may include at least one beveled gear, hypoid gear, or helical gear that may be configured to transfer torque into a mating and meshed gear of the front differential assembly 19. The first and second driveshafts 21, 23 are rotationally coupled to the front differential assembly 19, thereby allowing the driving torque to be transferred from the engine 13 through the transmission 15, through the final drive unit 17, and into the front differential assembly 19, thus driving the first and second driveshafts 21. The front differential assembly 19 includes a gear train that allows the first and second driveshafts 21, 23 to rotate at different angular velocities to accommodate vehicle turning or loss of traction by one driveshaft.

The power transfer unit (PTU) 30 includes an input shaft 31, which may be coupled to a component (e.g., a case, a carrier, a side-gear) of the front differential assembly 19, and an activating assembly 50, which may selectively couple the input shaft 31 to the propshaft 29 through a cam and gear assembly of the PTU 30. The power transfer unit 30, including the cam and gear assembly and the activating assembly 50, is discussed in greater detail below. According to an exemplary embodiment, the drive train includes an intermediate drive shaft 20 that is connected to the first driveshaft 21 to rotate the first wheel 22 of the vehicle.

The electronic control unit (ECU) or electronic control module (ECM) of the vehicle may actuate engagement of the activating assembly 50, coupling the propshaft 29 to the input shaft 31 through the PTU 30. The propshaft 29 is coupled to the rear drive unit (RDU) 90, which includes a rear differential assembly 92. Thus, the torque transferred through the propshaft 29 may be transferred into the rear differential assembly 92. The rear differential assembly 92 includes a gear train that allows the third and fourth driveshafts 25, 27 to rotate at different angular velocities to accommodate vehicle turning or loss of traction by one driveshaft. The ECU of the vehicle also actuates a vacuum system or another actuating system (e.g., a hydraulic system, an electronic system) that causes one or more than one second clutch mechanisms 94 included within the RDU 90 to engage substantially simultaneously, which transfers the torque from the differential assembly 92 to both the third and fourth driveshafts 25, 27. The vacuum or actuating system may be activated subsequent to actuation of the activating assembly 50 and after the drive train system 10 has been brought up to speed, or may be activated prior to actuation of the activating assembly 50.

FIGS. 2-6 illustrate an exemplary embodiment of a PTU 30 for use in a drive train system, such as the drive train system 10 of FIG. 1. The PTU 30 includes an input shaft 31, a disconnect shaft 36, an activating assembly 50, and a housing 40 configured to enclose at least a portion of the PTU 30. The input shaft 31 is configured to receive an input torque, such as from a component (e.g., a case, a carrier, a side-gear) of the front differential assembly 19, to rotate the input shaft 31 about an axis of rotation 34. According to an exemplary embodiment, the input shaft 31 is a hollow tube member coupled to the case of the front differential assembly 19 to receive the torque from the differential assembly. The input shaft 31 may be made from steel, aluminum, an aluminum alloy or any other suitable material strong enough to transmit the required torque for the life of the vehicle.

According to an exemplary embodiment, the input shaft 31 is configured to extend in a direction transverse to the longitudinal (or travelling) direction of the vehicle, and includes a first end 32 and a second end 33. The second end 33 may be coupled to the front differential assembly 19, so that torque transmitted through the front differential assembly 19 may drive the input shaft 31 in the corresponding rotational direction with substantially the same torque and frequency. The first end 32 may be configured to output (or transfer) the torque received, such as to the disconnect shaft 36 through the activating assembly 50. According to an exemplary embodiment, the first end 32 of the input shaft 31 includes a gear 48 having gear teeth configured to engage mating gear teeth of another device, such as a component (e.g., engaging member) of the activating assembly 50, through a gear mesh. The gear 48 of the input shaft 31 may be configured as a spur gear, a helical gear, a beveled gear, or any suitably shaped gear that transfers torque through motion. The gear 48 may be integrally formed with the input shaft 31 or may be formed separately then connected to the input shaft 31 through any suitable processing method such as welding, wherein the gear 48 and the input shaft 31 operate as one member.

The disconnect shaft 36 is configured to selectively rotate about the axis of rotation 34 to transfer torque. According to an exemplary embodiment, the disconnect shaft 36 is configured to selectively couple to the input shaft 31, through the gear 48 of the input shaft 31 and through the activating assembly 50 to transfer the torque from the input shaft 31 to the disconnect shaft 36. When the activating assembly 50 is activated, the disconnect shaft 36 is selectively coupled to the input shaft 31 to rotate with substantially the same torque and frequency. When the activating assembly 50 is deactivated, the disconnect shaft 36 is selectively decoupled from the input shaft 31, wherein no torque is transferred from the input shaft 31 to the disconnect shaft 36. When decoupled, the input shaft 31 and the disconnect shaft 36 may rotate with different frequencies and torques.

According to an exemplary embodiment, the disconnect shaft 36 is configured to include a first end 37, a second end 38 and a first gear 39 provided between the first and second ends 37, 38 to transfer torque. According to other embodiments, the first gear 39 may be provided on the first end, on the second end, or anywhere along the length of the disconnect shaft 36. The first and second ends 37, 38 may be configured as hollow tubes having similar or dissimilar diameters. For example, the disconnect shaft 36 may be configured with first and second ends 37, 38 that may have similar inner diameters and may have dissimilar outer diameters. The first gear 39 may be configured as a spur gear, a helical gear, a beveled gear, or any suitably shaped gear that transfers torque through motion. The disconnect shaft 36 may be made from steel, aluminum, an aluminum alloy or any other suitable material strong enough to transmit the required torque for the life of the vehicle.

According to an exemplary embodiment, the first end 37 of the disconnect shaft 36 includes a second gear 47 integrally formed with the disconnect shaft 36, wherein the second gear 47 includes gear teeth that are configured to transfer torque when engaged by a device, such as the activating assembly 50. The second gear 47 of the disconnect shaft 36 may be configured as a spur gear, a helical gear, a beveled gear, or any suitably shaped gear that transfers torque through motion. According to other embodiments, the second gear 47 may be configured anywhere along the length of the disconnect shaft 36, such as the second end, and/or the second gear 47 may be separately formed from the disconnect shaft 36 then connected to the disconnect shaft 36 using any suitable method such as welding.

The PTU 30 may include bearings to improve the efficiency of the relative rotation between components therein, such as by reducing friction generated by the rotation of the components therein. According to an exemplary embodiment, the bearings or needle bearings 41 may be provided between the disconnect shaft 36 and the input shaft 31 to allow for efficient rotation of the input shaft 31 relative to the disconnect shaft 36. For example, the PTU 30 may include a first needle bearing 41 provided between the first end 37 of the disconnect shaft 36 and the first end 32 of the input shaft 31, and may include a second needle bearing 41 provided between the second end 38 of the disconnect shaft 36 and the second end 33 of the input shaft 31, wherein the bearings 41 allow for concentric and efficient rotation of the input shaft 31 relative to the disconnect shaft 36. The PTU 30 may include additional bearings. For example, the PTU 30 may include hearings 42 provided between the housing 40 and the disconnect shaft 36 to allow concentric and efficient rotation of the disconnect shaft 36 relative to the housing 40 and/or the input shaft 31.

According to another exemplary embodiment, the activating assembly 50 is configured to couple the disconnect shaft 36 to the input shaft 31 when activated and is configured to decouple the disconnect shaft 36 from the input shaft 31 when deactivated. When the activating assembly 50 is activated, the torque from the input shaft 31 is transferred to the disconnect shaft 36, such that the disconnect shaft then rotates with the same frequency and torque as the input shaft. When the activating assembly 50 is deactivated, no torque is transferred from the input shaft 31 to the disconnect shaft 36. Wherein the input shaft rotates with a torque and frequency that may differ from the torque and frequency of the disconnect shaft.

According to an exemplary embodiment, the activating assembly 50 includes a rotating cam 51, a sliding cam 52, an engaging gear 54, and an actuator 57. The actuator 57 may be configured to rotate the rotating cam 51 a predetermined angular travel (e.g., 120°, 10°, etc.), wherein said rotation of the rotating cam 51 allows the sliding cam 52 to move from a first deactivated position to a second activated position to thereby couple the disconnect shaft 36 to the input shaft 31 to transfer the torque from the input shaft 31 to the disconnect shaft 36. The actuator 57 may also be configured to then rotate the rotating cam 51 another predetermined angular travel, wherein said rotation of the rotating cam 51 drives or moves the sliding cam 52 from the second activated position back to the first deactivated position, such that no torque is transferred from the input shaft 31 to the disconnect shaft 36. The actuator 57 may be configured to rotate the rotating cam 51 between the activated and deactivated positions as required by the PTU and/or the drive train system. According to an exemplary embodiment, the actuator 57 includes a motor (e.g., electric motor), a shaft that may be rotationally driven by the motor, and a gear that is connected to the shaft in order to rotate with the shaft when selectively driven by the motor. The actuator may also include a device, such as a planetary-gear-train, to provide for a change in the gearing (i.e., the gear ratio), such as by providing gear-reduction. Alternatively, the actuator 57 may be any device that may drive rotation of a coupled gear.

The activating assembly 50 of the PTU 30 may include a sensor (not shown) that may be configured to monitor the angular position of the rotating cam 51. The sensor may communicate the monitored angular position of the rotating cam 51 to another device, such the electronic control unit (ECU) (not shown) of the vehicle. Accordingly the ECU may control the length of time the actuator 50 is activated in order to rotate the rotating cam 51 the predetermined angular travel, such as to move the rotating cam 51 between activated and deactivated positions.

Figure 5:
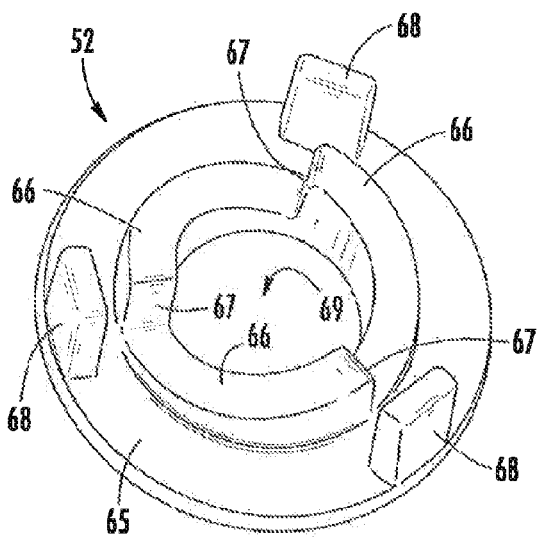
FIG. 5 is a perspective view of an exemplary embodiment of a sliding cam for use in an activating assembly of a power transfer unit, such as the power transfer unit of FIG. 2.

FIG. 5 illustrates an exemplary embodiment of the sliding cam 52 for use in the activating assembly 50 of the PTU 30. The sliding cam 52 may include an annular portion 65, one or more than one disengaging cam surface 66, one or more than one engaging earn surface 67, and one or more than one projection (or arm or splines) 68. According to the exemplary embodiment Shown FIG. 5, the sliding cam 52 includes annular portion 65, three disengaging cam surfaces 66, three engaging cam surfaces 67, and three projections arm or splines) 68. The sliding cam 52 may be made from steel, aluminum, an aluminum alloy, a plastic or polymer material, a composite material, a powdered metal, or any other suitable material strong enough to cyclically engage, such as between activating and deactivating positions, the rotating cam and other PTU components for the life of the vehicle. The sliding cam 52 may be formed through casting, forging, machining, molding (e.g., injection molding), powdered metal (e.g., sintering or molding), or any suitable processing method.

According to an exemplary embodiment, the disengaging cam surface 66 of the sliding cam 52 is configured as an inclined or oblique surface having a gradually increasing slope between the two adjacent engaging cam surfaces 67. However, the disengaging cam surface 66 may be curved (e.g., concave, convex) or may be configured to have any suitable shape. According to an exemplary embodiment, the engaging cam surface 67 of the sliding earn 52 is configured as a substantially vertical surface or a steeply decreasing inclined surface between the two adjacent disengaging cam surfaces 66. However, the engaging cam surface may be curved (e.g., concave, convex) or may be configured to have any suitable shape. The shape of the engaging and disengaging cam surfaces of the sliding cam 52 may be varied to tailor the performance of the activating assembly 50, such as to operate collectively with the cam surfaces of the rotating cam 51 to define the shift distance (e.g., for the sliding cam) with respect to the angular cam rotation (e.g., for the rotating cam). In other words, the profiles or shapes of the cams (e.g., sliding and rotating) may be varied to tailor performance of the PTU, such as to accommodate differing customer specifications or preferences. Thus, the shapes of the cams disclosed herein are meant as exemplary embodiments and are not meant as limitations.

The projection 68 of the sliding cam 52 is configured to prevent rotation of the sliding cam 52, since the rotating cam 51 may rotate while in contact with the sliding cam 52. According to an exemplary embodiment, the projection 68 has a rectangular cross-sectional shape configured to engage a cavity within the housing 40 of the PTU 30, wherein the cavity of the housing 40 may be configured to prevent rotation of the sliding cam 52, such as by having a similar cross-sectional shape and thereby retaining the projection 68 therein. According to other embodiments, the projection may be configured with any shape (e.g., round, semi-circular, irregular, splines), and may be configured to engage any rotationally fixed (or stationary) component of the PTU 30 to prevent the rotation of the sliding cam 52 relative to the rotating earn 51.

Figure 4:
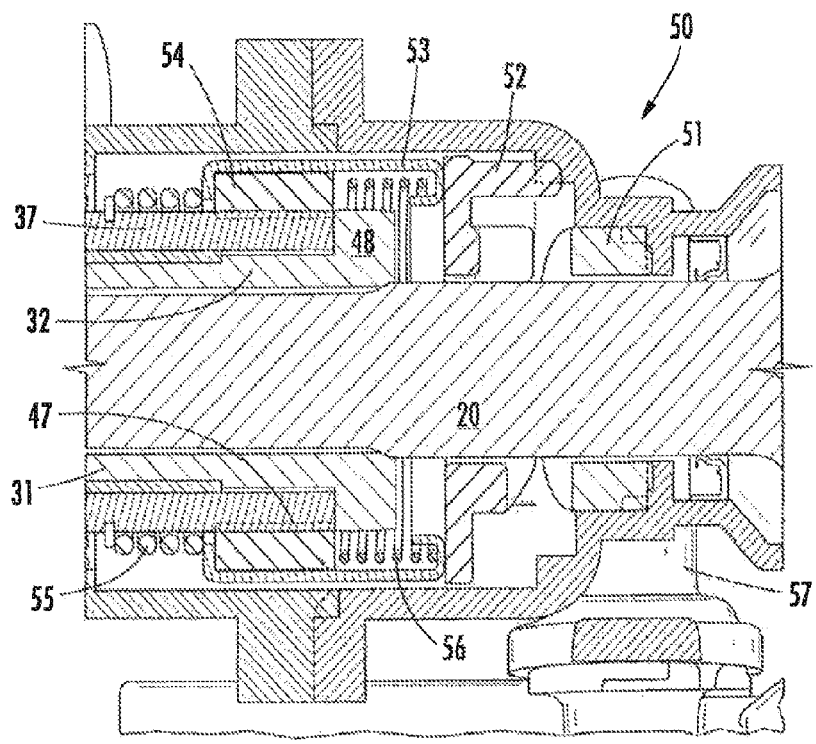
FIG. 4 is a detail view of an exemplary embodiment of the activating assembly of the power transfer unit of FIG. 2.

The sliding cam 52 may also include an opening 69 that may be configured to receive another vehicle component, such as the intermediate drive shaft 20 as shown in FIG. 4. The size (e.g., diameter) of the opening 69 may vary and may be configured to provide clearance between the sliding cam 52 and the other component (e.g., intermediate drive shaft 20) passing therethrough, for example, to allow the intermediate drive shaft 20 to rotate relative to the sliding cam 52 without introducing energy loss, such as by friction, that may result from contact between the rotating shaft and the rotationally stationary sliding cam.

Figure 6:
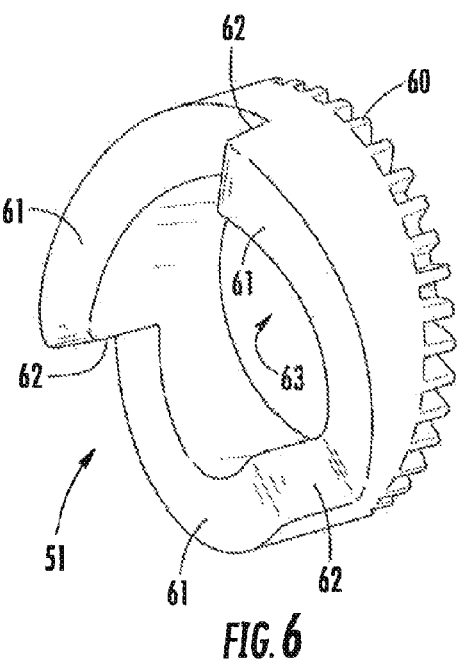
FIG. 6 is a perspective view of an exemplary embodiment of a rotating cam for use in an activating assembly of a power transfer unit, such as the power transfer unit of FIG. 2.

FIG. 6 illustrates an exemplary embodiment of the rotating cam 51 for use in the activating assembly 50 of the PTU 30. The rotating cam 51 may include an annular gear portion 60, one or more than one disengaging cam surface 61, and one or more than one engaging cam surface 62. According to the exemplary embodiment shown in FIG. 6, the rotating cam 51 includes an annular gear portion 60, three disengaging cam surfaces 61, and three engaging cam surfaces 62. The rotating cam 51 may be made from steel, aluminum, an aluminum alloy, a plastic or polymer material, a composite material, a powdered metal, or any other suitable material strong enough to cyclically engage the sliding earn and other PTU components (e.g., the actuator) for the life of the vehicle. The rotating cam 51 may be formed through casting, forging, machining, molding (e.g., injection molding), powdered metal (e.g., sintering or molding), or any suitable processing method.

According to an exemplary embodiment, the disengaging cam surface 61 of the rotating cam 51 is configured as an inclined (or oblique) surface having an increasing slope between the two adjacent engaging cam surfaces 62. However, the disengaging cam surface may be curved (e.g., concave, convex) or may be configured to have any suitable shape. According to an exemplary embodiment, the engaging cam surface 62 of the rotating cam 51 is configured as a substantially vertical surface or a steeply decreasing inclined surface between the two adjacent disengaging cam surfaces 61. However, the engaging cam surface may be curved (e.g., concave, convex) or may be configured to have any suitable shape. The shape of the engaging and disengaging cam surfaces of the rotating cam 51 may be varied to tailor the performance of the activating assembly 50, such as to operate collectively with the cam surfaces of the sliding cam 52 to define the shift distance (e.g., for the sliding cam) with respect to the angular cam rotation (e.g., for the rotating cam). In other words, the profiles or shapes of the cams (e.g., sliding and rotating) may be varied to tailor performance of the PTU, such as to accommodate differing customer specifications or preferences. Thus, the shapes of the cams disclosed herein are meant as exemplary embodiments and are not meant as limitations.

According to an exemplary embodiment, the annular gear portion 60 of the rotating cam 51 is configured to engage through a gear mesh a mating gear on the actuator, such as the actuator 57, wherein the actuator controls and drives the rotation of the rotating cam 51 through the gear mesh with the gear portion 60. The annular gear portion 60 may be configured as a spur gear, a helical gear, a beveled gear, or any suitably shaped gear that transfers torque through motion (e.g., rotational motion). The gear portion 60 may be integrally formed with the rotating cam 51 or formed separately then connected to the rotating cam 51 to operate as one member.

The rotating cam 51 may also include an opening 63 that may be configured to receive another component of the vehicle, such as the intermediate drive shaft 20 as shown in FIG. 4. The size (e.g., diameter) of the opening 63 may vary and may be configured to provide clearance between the rotating cam 51 and the component (e.g., intermediate drive shaft 20) passing therethrough, for example, to allow the intermediate drive shaft 20 to rotate relative to the rotating cam 51 without introducing energy loss, such as by friction, that may result from contact between the rotating input drive shaft and the selectively rotational rotating cam, which may rotate at differing rotational speeds.

The number of cam surfaces 61, 62 provided on the rotating cam 51 and the sliding cam 52 influence the angular travel of the rotating cam 51 that is necessary to move the sliding cam 52 between the activated and deactivated positions. For example, the rotating cam 51 is configured to both disengage and engage the PTU 30 (i.e., decouple and couple the disconnect shaft 36 from the input shaft 31) within one-hundred and twenty degrees (120°) of rotation by the rotating cam 51. Thus, the rotating cam 51 is configured to disengage and engage the PTU 30 three times for each full rotation (i.e., over an angular rotation of three-hundred and sixty degrees (360°) by the rotating cam 51. Accordingly, the rotating cam 51 may be configured to include any number of cam surfaces 61, 62, which in turn varies the angular rotation of the rotating cam 51 that is necessary to activate and deactivate the PTU 30.

According to another exemplary embodiment, the sliding cam 52 includes an annular portion 65 and one or more than one projection 68 (or arm or spline). Thus, the sliding cam 52 may be configured to not include any earn surfaces 66, 67, wherein the cam surfaces 61, 62 (e.g., engaging, disengaging) of the rotating cam 51 drive the sliding cam 52 between the activated (or engaged) position and the deactivated (or disengaged) position, as required. The rotating cam 51 could be configured to include any number of cam surfaces 61, 62 having any shape, which control the position of the sliding cam 52 through rotational position (or orientation) of the rotating cam 51.

According to an exemplary embodiment, the activating assembly 50 is provided within the PTU 30, such as within the housing 40 of the PTU 30. According to another exemplary embodiment, the activating assembly 50 is provided within a separate case (not shown), which may be connected to the housing 40.

Also, as shown in FIGS. 2-6, the activating assembly 50 may be provided in the region of the PTU 30 that is near the first end 37 of the disconnect shaft 36 and may be configured to encircle at least a portion of the input shaft 31, such as the gear 48. Alternatively, the activating assembly 50 may be provided anywhere in the PTU 30. The rotating cam 51 may encircle a portion of the intermediate drive shaft 20, wherein the intermediate drive shaft 20 passes through the opening 63 of the rotating cam 51. The rotating cam 51 may be concentric to the intermediate drive shaft 20, such that the rotating cam 51, when driven to rotate by the actuator 57, rotates substantially about the axis of rotation 34. The rotating cam 51 may be positioned by the housing 40 or may be positioned by any other component, wherein bearings may be provided between the rotating cam 51 and another PTU 30 component (e.g., housing 40) to allow for rotation of the rotating cam 51 relative to the other component.

The sliding cam 52 may be provided adjacent to the rotating cam 51, such that the cam surfaces 66, 67 of the sliding cam 52 may be in contact with the cam surfaces 61, 62 of the rotating cam 51. According to an exemplary embodiment, each disengaging cam surface 61 of the rotating earn 51 remains in contact with one disengaging cam surface 66 of the sliding cam 52. The disengaging cam surface 66 of the sliding cam 52 that the disengaging cam surface 62 of the rotating cam 51 contacts may change depending on the rotational position of the rotating cam 51, since the rotating cam 51 rotates relative to the rotationally stationary sliding cam 52. As the rotating cam 51 rotates, the portions of the cam surfaces in contact between the sliding and rotating cam changes, which induces the sliding cam 52 to move away from or toward the rotating cam 51 depending on the location of contact. Depending on the alignment or the angular orientation between the rotating 51 and sliding cams 52, the rotating cam 51 may drive the sliding cam 52 or allow the sliding cam 52 to move between activated and deactivated positions. When the sliding cam 52 is positioned in the activated position, the activating assembly 50 couples the disconnect shaft 36 to the input shaft 31 to transfer torque from the input shaft 31 to the disconnect shaft 36. When the sliding cam 52 is positioned in the deactivated position, the activating assembly 50 decouples the disconnect shaft 36 from the input shaft 31, wherein no torque is transferred from the input shaft 31 to the disconnect shaft 36.

According to an exemplary embodiment, the engaging gear 54 is configured to couple and decouple the disconnect shaft 36 to and from the input shaft 31 to transfer (or not to transfer) the torque from the input shaft 31 to the disconnect shaft 36. The engaging gear 54 may be configured as an annular member having gear teeth provided along the inside surface (or inner diameter), wherein the gear teeth may engage through a gear mesh the gear teeth of either or both the disconnect shaft 36 and the input shaft 31. Additionally, the engagement gear 54 may be a splined sleeve or any suitable component to couple the disconnect shaft 36 and the input shaft 31. For example, the engaging gear 54 may be configured to engage the second gear 47 of the disconnect shaft 36 and may be configured to selectively engage the gear 48 of the input shaft 31. According to the exemplary embodiment shown in FIGS. 2-6, the engaging gear 54 is configured to engage through a gear mesh only the disconnect shaft 36 and the gear second 47 when the PTU 30 is configured in the disconnected or deactivated mode of operation, wherein no torque is transferred from the input shaft 31 to the disconnect shaft 36. When the PTU 30 is configured in the connected or activated mode of operation, the engaging gear 54 is configured to engage through a gear mesh both the disconnect shaft 36 via the second gear 47 and the input shaft 31 via the gear 48 to transfer the torque from the input shaft 31 to the disconnect shaft 36.

According to another exemplary embodiment, the engaging gear 54 of the activating assembly may be configured to engage through a gear mesh only the input shaft 31 when the PTU 30 is configured in the disconnected or deactivated mode of operation, wherein no torque is transferred from the input shaft 31 to the disconnect shaft 36. When the PTU 30 is configured in the connected or activated mode of operation, the engaging gear 54 may be configured to engage through a gear mesh both the disconnect shaft 36 and the input shaft 31 to transfer the torque from the input shaft 31 to the disconnect shaft 36.

The activating assembly 50 may also include a first biasing member 55 to provide force to bias a component of the activating assembly 50, such as the engaging gear 54. According to an exemplary embodiment, the first biasing member 55 is configured as a coil spring and provides force to bias the engaging gear 54 in the direction toward the activated position (i.e., where the engaging gear 54 engages both the disconnect shaft 36 and the input shaft 31 to transfer torque from the input shaft 31 to the disconnect shaft 36). According to other exemplary embodiments, the first biasing member 55 may be configured as a wave spring or any other suitable type of spring having any suitable shape that may bias the engaging gear 54 in a direction, such as in the direction toward the deactivated position (i.e., where the engaging gear 54 engages only the disconnect shaft 36 or the input shaft 31).

The activating assembly 50 may also include a second biasing member 56 to provide force to bias a component of the activating assembly 50, such as the engaging gear 54. According to an exemplary embodiment, the first biasing member 55 is configured as a coil spring and provides force to bias the engaging gear 54 in the direction toward the deactivated position (i.e., where the engaging gear 54 engages only the disconnect shaft 36 or the input shaft 31). According to other embodiments, the second biasing member 56 may have any suitable shape and may bias the engaging gear 54 in a different direction, such as in the direction toward the activated position (i.e., where the engaging gear 54 engages both the disconnect shaft 36 and the input shaft 31 to transfer torque from the input shaft 31 to the disconnect shaft 36). The second biasing member 56 may also be configured to protect the actuator 57 from stalling and damage.

The activating assembly 50 may also include a guide member 53 (or drawn cup) to guide or drive the movement of the engaging gear 54 between the activated and deactivated modes of operation. According to an exemplary embodiment, the guide member 53 is configured as a thin walled formed member having a substantially C-shaped cross-section, wherein one end of the guide member 53 surrounds at least a portion of the engaging gear 54 and the other end of the guide member abuts the sliding cam 52, such as the end of the sliding cam 52 opposite the end in contact with the rotating cam 51. Also, provided between the engaging gear 54 and the end of the guide member 53 that abuts the sliding cam 52 is a space that may retain the second biasing member 56, wherein the second biasing member 56 provides a force to bias the engaging gear 54 away from the end of the guide member 53 that abuts the sliding cam 52 and/or protects the actuator 57 from non-desirable operating conditions, such as from torque-binding.

The guide member 53 may be made from steel, aluminum, or any other suitable material strong enough to cyclically engage the sliding cam 52 and other PTU components for the life of the vehicle. The guide member 53 may be formed through stamping, blanking, fine blanking, or any suitable processing method.

Figure 2:
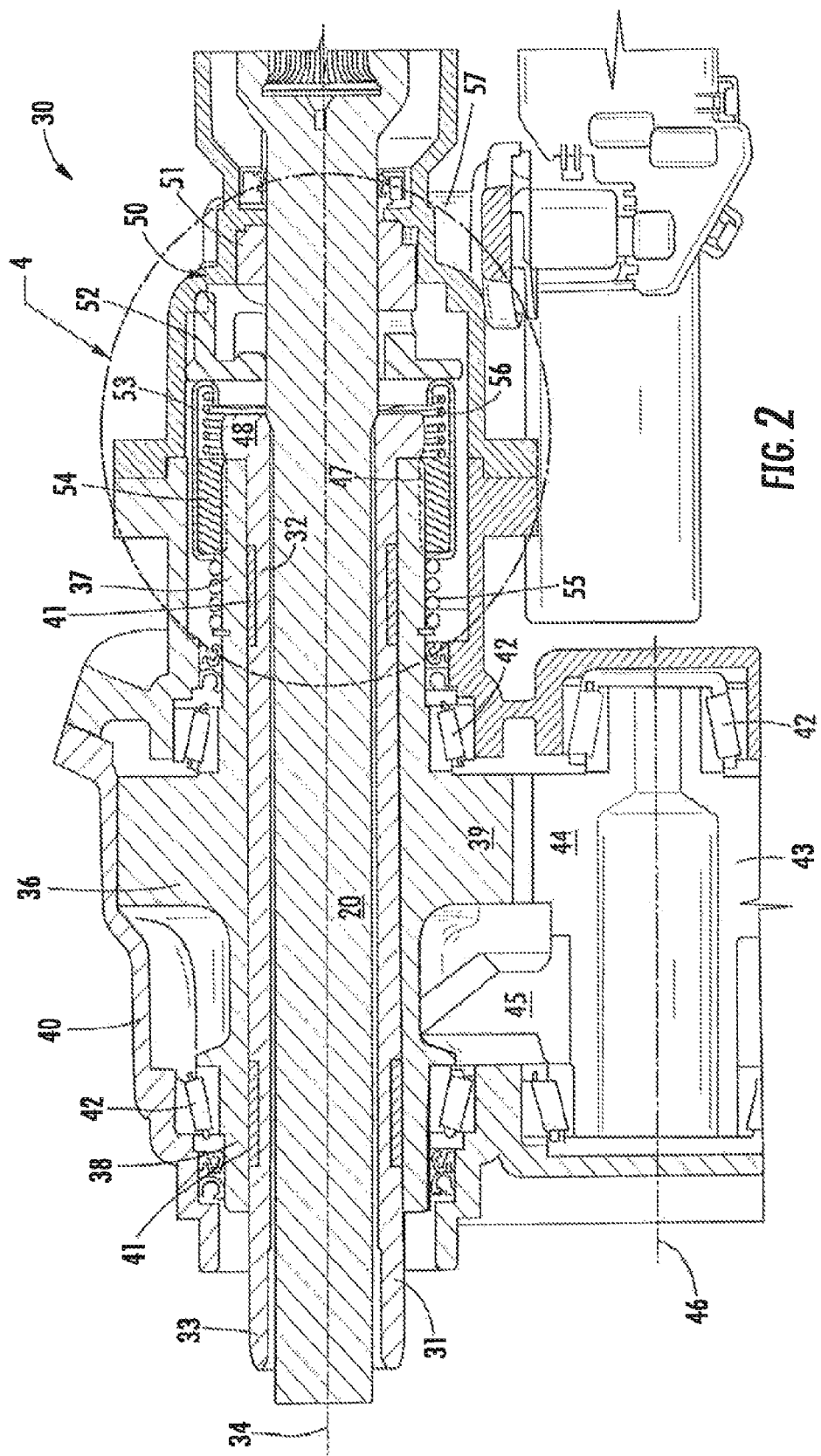
FIG. 2 is a cross-sectional view of an exemplary embodiment of a power transfer unit configured for use within a drive train system of a vehicle, such as the drive train system of FIG. 1, shown configured in the deactivated mode of operation with the disconnect shaft decoupled from the input shaft.
Figure 3:
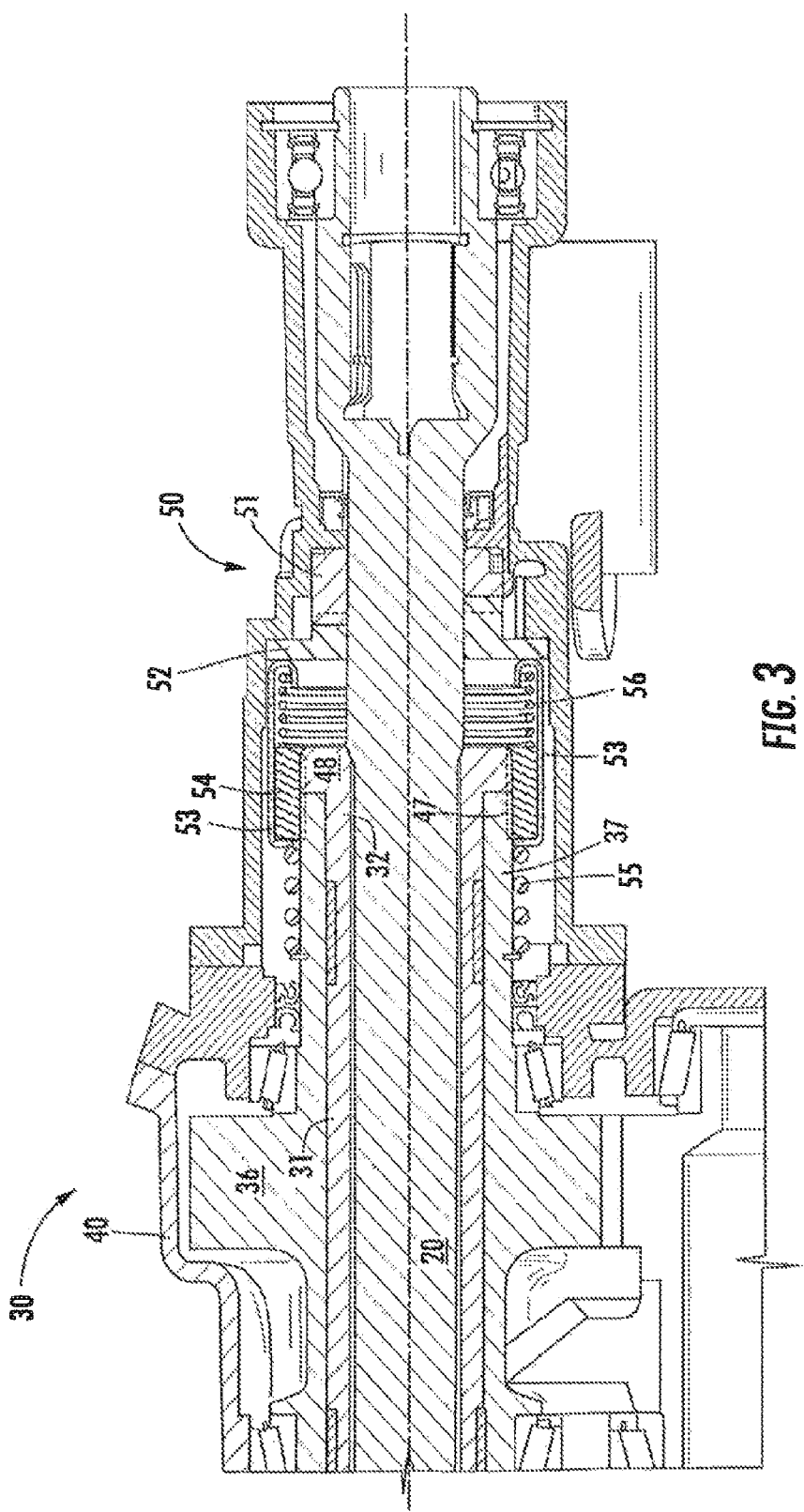
FIG. 3 is a is a cross-sectional view illustrating the power transfer unit of FIG. 2 configured in the activated mode of operation with the disconnect shaft coupled to the input shaft.

As shown in FIGS. 2 and 3, when the activating assembly 50 is configured in the deactivated or disconnected mode of operation, wherein no torque is transferred to the disconnect shaft 36 from the input shaft 31, the engaging gear 54 engages (or rotationally couples) only the disconnect shaft 36, such as through the second gear 47 of the disconnect shaft 36. In this deactivated mode of operation, the rotating cam 51 is rotated a predetermined angular rotation by the actuator 57, wherein the cam surfaces of the rotating cam 51 and sliding cam 52 move the sliding cam 52 in a direction away from the rotating cam 51, which in turn moves the guide member 53 substantially the same distance thereby compressing the first biasing member 55 and storing energy therein. The second biasing member 56 having stored energy exerts a force to bias the engaging gear 54 in the direction out of engagement with the input shaft 31 (i.e., in the direction away from the sliding cam 52), such that the engaging gear 54 abuts the end of the guide member 53 adjacent to the first biasing member 55. Thus, the gear teeth of the engaging gear 54 engage only the disconnect shaft 36 and do not engage the input shaft 31 in the deactivated or disconnected mode of operation.

As shown in FIGS. 4 and 5, when the activating assembly 50 is configured in the activated or connected mode of operation, wherein the torque is transferred to the disconnect shaft 36 from the input shaft 31 through the engaging gear 54, the engaging gear 54 engages (or rotationally couples) both the disconnect shaft 36 and the input shaft 31 simultaneously. In this activated mode of operation, the rotating cam 51 is rotated a predetermined angular rotation by the actuator 57, wherein the cam surfaces of the rotating cam 51 allows the sliding cam 52 to move in the direction toward the rotating cam 51, which in turn allows the guide member 53 to move substantially the same distance from the force exerted by the uncompressing of the first biasing member 55. In other words, the stored energy within the first biasing member 55 exerts a force that maintains abutment (or engagement) of the guide member 53 and the sliding cam 52, as well as moving the guide member 53 and the sliding cam 52 toward the rotating cam 51. The second biasing member 56 having stored energy exerts a force to bias the engaging gear 54 in the direction away from the sliding cam 52 (or toward the first biasing member 55), such that the engaging gear 54 abuts the end of the guide member 53 adjacent to the first biasing member 55. When the guide member 53 moves with the sliding cam 52 toward the rotating cam 51, it pulls the engaging gear 54 into engagement with the input shaft 31, such that the engaging gear 54 also continues to engage the disconnect shaft 36. Thus, the gear teeth of the engaging gear 54 engage both the disconnect shaft 36 and the input shaft 31 simultaneously in the activated or connected mode of operation.

The PTU 30 may also include a second shaft 43 that is configured to receive the torque from the disconnect shaft 36 and transfer the torque to an output shaft or directly to the propshaft 29 in order to drive the rear wheels. The second shaft 43 may be provided parallel and offset a distance from the input shaft 31. The second shall 43 may be configured to rotate about a second axis of rotation 46, which may be parallel to the axis of rotation 34 of the input shaft 31. The second shaft 43 may include a gear 44, which may be configured as a spur gear, helical gear, or any suitable gear that transfers torque through motion (e.g., rotational motion). The teeth of the gear 44 may engage the teeth of the first gear 39 of the disconnect shaft 36 through a gear mesh in order to receive torque from the disconnect shaft 36.

The second shaft 43 may also include a second ring gear 45, wherein the second ring gear 45 may be formed separately from then connected to the second shaft 43, or may be integrally formed with the second shaft 43 as one member. The second ring gear 45 may be a beveled gear or a spur, helical, or any suitable gear and is configured to transfer torque from the second shaft 43, such as to the pinion of an output shaft. The second shaft 43 may be provided within the housing 40 of the PTU 30 or may be provided within a structure separate from the housing 40. The second shaft 43 may be rotatably coupled to the housing 40 or structure by one or more bearings 42 in order to allow the second shaft 43 to rotate about the second axis of rotation 46 relative to the housing 40.

According to another exemplary embodiment, the torque is transferred from the disconnect shaft 36 directly to an output shaft 43. According to another exemplary embodiment, the torque is transferred from the disconnect shaft 36 directly to a component external to the PTU, such as to the propshaft 29 of the vehicle.

Figure 7:
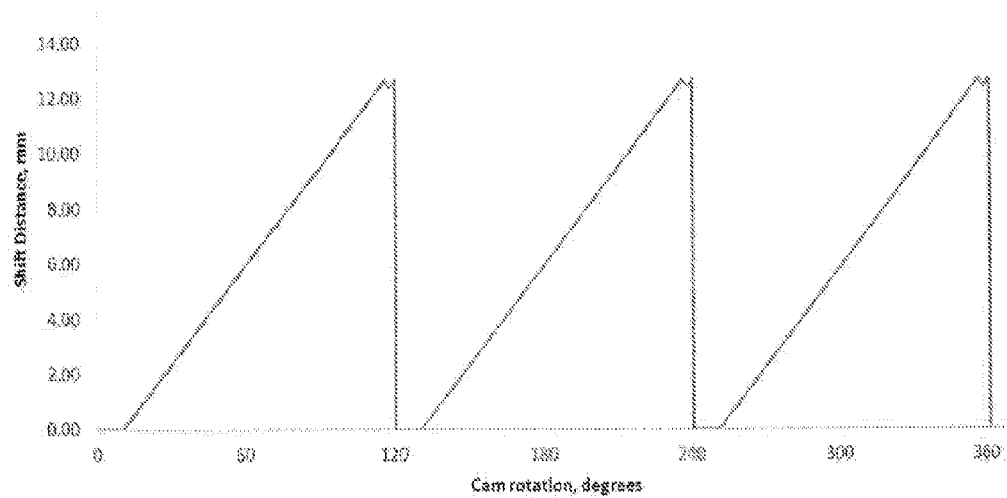
FIG. 7 is a graph illustrating the displacement of a sliding cam as a function of the angular rotation of a rotating cam for one full revolution of the rotating cam.
Figure 8:
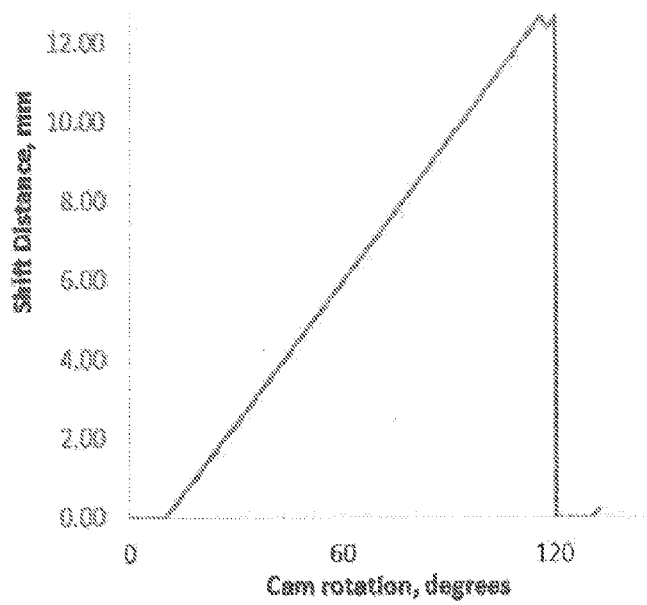
FIG. 8 is a graph illustrating the displacement of a sliding cam as a function of the angular rotation of a rotating cam for one-third of one full revolution of the rotating cam.

FIGS. 7-8 are graphs that illustrate the shift distance in mm of the sliding cam over the angular rotation of the rotating cam in degrees, according to an exemplary embodiment. FIG. 7 illustrates the shift distance in mm of the sliding cam over one full revolution or rotation (i.e., three-hundred and sixty degrees (360°)) of the rotating cam. FIG. 8 illustrates the shift distance in mm of the sliding earn over approximately one third of one full revolution or rotation (i.e., the first one-hundred and twenty degrees (120°) of rotation) of the rotating cam. There is a gradual increase in shift distance of the sliding cam as the rotating cam is rotated. At the fully disengaged position there is a slight detent or decrease in shift distance. Then, upon actuation there is a rapid release of energy to shift the cams into engagement and reduce the shift distance.

For the exemplary embodiment shown, the rotating cam is configured to rotate from an engaged (or activated) position to a disengaged (or deactivated) position in about 0.70 seconds and is configured to rotate from an disengaged (or deactivated) position to an engaged (or activated) position in about 0.09 seconds. The cam surfaces are configured to provide the PTU with a gradual disengagement (or deactivation) of the PTU to decouple the disconnect shaft from the input shaft (or input shaft). The cam surfaces are configured to provide the PTU with a rapid engagement (or activation) of the PTU to couple the disconnect shaft to the input shaft. Although, graphs FIGS. 7-8 illustrate an exemplary embodiment, the slopes of both the disengagement (or deactivation) and the engagement (or activation) may be varied to tailor performance of the PTU to specific customer requirements or to provide a specific performance, such as by tailoring the profiles or surfaces (e.g., engaging, disengaging) of the cams of the activating assembly. Additionally, the shift distance in mm may be varied to tailor performance. These graphs illustrate exemplary embodiments and should not be interpreted as limitations.

According to an exemplary embodiment, both the time in seconds (s) required to rotate the rotating cam from the disengaged position to the engaged position and from the engaged position to the disengaged position may be calculated. For example, an activating assembly configured to include a motor, as an actuator, that is configured to rotate at 2500 revolutions per minute (rpm) with a drive ratio to cam of 98:1, the motor may rotate the rotating cam about 13.3° in about 0.087 s, wherein the rotating cam may rotate from a disengaged position to an engaged position. Also, for example, a similarly configured activating assembly may be configured to rotate the rotating cam about 106.7° in about 0.697 s, wherein the rotating cam may rotate from an engaged position to a disengaged position. Although these calculations are for one exemplary embodiment of a PTU, they are not meant as limitations because the PTUs disclosed herein may be configured having different components (e.g., the actuator) having different performance characteristics (e.g., speed, drive ratio, etc.), which may produce a different time required to rotate the rotating cam. For example, the time required to engage and/or disengage the PTU through the activating assembly may be tailored based on the performance and requirements of a specific vehicle or customer.

The total time in seconds required to switch an exemplary embodiment of a PTU (and hence the drive-train of the vehicle) from the deactivated or disconnected mode of operation to the activated or connected mode of operation to thereby switch the vehicle from a two-wheel drive mode of operation to a four-wheel or all-wheel drive mode of operation may be calculated. For example, the activating assembly of the PTU may switch the PTU from a disengaged or deactivated mode of operation to an engaged or activated mode of operation (thereby switching the vehicle from a two-wheel drive mode of operation to an all-wheel drive mode of operation) in less than 0.100 seconds. This rapid engagement provides several advantages discussed below. Although this calculation is for one exemplary embodiment of a PTU, it is not meant as a limitation because the PTUs disclosed herein may be configured having different components (e.g., the actuator) having different performance characteristics (e.g., speed, drive ratio, etc), which may produce a different time required to activate or deactivate the PTU. For example, the time required to engage and disengage the PTU through the activating assembly may be tailored based on the performance and requirements of a specific vehicle or customer.

The PTUs, as disclosed herein, that include activating assemblies having the cam and gear assembly, provide several advantages over other PTUs having other types of activation devices, although only sonic of the advantages are discussed herein. First, the activating assemblies provide the PTU with a faster engagement time (or a shorter shift time), meaning the PTU can switch the drive train of the vehicle from a two-wheel drive mode of operation to an all-wheel drive mode of operation in a relative shorter time. For example, according to an exemplary embodiment, the total engagement time was calculated to be less than 0.100 seconds. A decreased shift time improves responsiveness of the vehicle to redistribute torque to other wheels, such as when one or more of the driven wheels of the vehicle slip, which may improve handling of the vehicle. A faster engagement time also allows the PTU to switch between modes of operation when there is a relative higher difference between (or change in) the speeds (e.g., rpm) of the input shaft and the disconnect shaft. In other words, the faster engagement time of the PTU allows coupling of the disconnect shaft to the input shaft when a relative higher difference in operating speeds between the input shaft and disconnect shaft exists. The shorter time required to couple the disconnect shaft to the input shaft improves the durability of the PTU by bring the full engagement of the teeth in the gear mesh together quicker to minimize the impact on the tips of the teeth from the gear clash, which reduces the possibility of damage to the gear teeth. The shorter time required to couple the disconnect shaft to the input shaft may also reduce the noise of the PTU by reducing the noise associated with the gear clash when the teeth of the gears are meshed. Second, the engagement and disengagement time can be easily tailored to varying customer requirements (e.g., performance requirements) by modifying the profile of the surfaces of the cams. Third, the activating assemblies, as disclosed herein, have a relative smaller package size, since the activating assemblies are able to be configured within a smaller package and without a number of components, such as shift forks. The smaller package size may be configured to have a relative lower mass, which allows the vehicle manufacturer to reduce the size and mass of the vehicle. Fourth, the actuator (e.g., motor) may be configured to be less complex and less expensive. For example, the motor may be configured to have a relative smaller package size, as the motor may be configured to rotate only in one rotational direction and may be configured with simpler (and less expensive) electronics, such as by not needing a circuit board. Also, for example, the motor may be configured to provide similar speed and force with a reduced current draw. These changes may also increase the operating life of the motor.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or movable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the power transfer units as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A power transfer unit for use in a vehicle for transferring a torque, the power transfer unit comprising:
   a first shaft configured to receive the torque from a vehicle transmission or a device connected directly to the vehicle transmission;
   a second shaft configured to output the torque to a propshaft; and
   an activating assembly for selectively transferring the torque from the first shaft to the second shaft, the activating assembly including;
   a sliding cam that includes an engaging cam surface and a disengaging cam surface;
   a rotating cam that includes an engaging cam surface and a disengaging cam surface that are configured to engage or be engaged by the engaging cam surface and the disengaging cam surface of the sliding cam to move the sliding cam through relative rotation between the rotating cam and the sliding cam, and wherein at least one of the disengaging and engaging cam surfaces is configured as a surface that is substantially parallel to the direction of movement of the sliding cam;
an actuator that is electrically actuated, adapted to communicate with an electronic control that actuates the actuator, and is configured to selectively rotate the rotating cam relative to the sliding cam;
an engaging gear;
wherein the engaging gear is configured to be moved by the sliding cam between a first engaged position where the torque is transferred from the first shaft to the second shaft through the engaging gear and a second disengaged position where no torque is transferred to the second shaft;
wherein relative rotation between the rotating cam and the sliding cam moves the sliding cam thereby moving the engaging gear between the first engaged and second disengaged positions.

2. The power transfer unit of claim 1, wherein the sliding cam includes a cam surface that is configured to engage a cam surface on the rotating cam to move the sliding cam through relative rotation between the rotating cam and the sliding cam.

3. The power transfer unit of claim 1, wherein at least one of the disengaging and engaging cam surfaces is configured as an inclined surface.

4. The power transfer unit of claim 1, wherein at least one of the disengaging and engaging cam surfaces is configured as a curved surface.

5. The power transfer unit of claim 1, wherein the activating assembly also includes a guide member that is configured to be driven by the sliding cam to move the engaging gear between the first engaged and second disengaged positions.

6. The power transfer unit of claim 5, wherein the guide member includes a first end, a second end, and a wall connecting the ends, the first end being configured to abut the sliding cam and the second end being configured to drive movement of the engaging gear.

7. The power transfer unit of claim 6, wherein the activating assembly also includes a first biasing member disposed between the first end of the guide member and the engaging gear to bias the engaging gear toward the second end of the guide member.

8. The power transfer unit of claim 7, wherein the activating assembly also includes a second biasing member configured to bias the guide member toward the sliding cam.

9. The power transfer unit of claim 1, further comprising a biasing member that is configured to bias the engaging gear toward the sliding cam.

10. The power transfer unit of claim 1, further comprising a sensor that is configured to monitor an angular position of the rotating cam.

11. The power transfer unit of claim 1, further comprising a housing, wherein the sliding cam includes a projection that engages the housing to prevent rotation of the sliding cam relative to the housing.

12. The power transfer unit of claim 1 wherein the actuator includes a motor that is coupled to the rotating cam.

13. The power transfer unit of claim 12 wherein the motor is coupled to a gear through which the rotating cam is driven for rotation.

14. The power transfer unit of claim 13 wherein the rotating cam includes a gear that is engaged by the gear coupled to the motor.

15. The power transfer unit of claim 12 wherein at least one of the sliding cam and the rotating cam has multiple engaging cam surfaces and multiple disengaging cam surfaces.

16. The power transfer unit of claim 15 wherein each engaging cam surface is between two disengaging cam surfaces.

17. A power transfer unit for use in a vehicle for transferring a torque, the power transfer unit comprising:
a first shaft configured to receive the torque from a vehicle transmission or a device connected directly to the vehicle transmission;
a second shaft configured to output the torque to a propshaft; and
an activating assembly for selectively transferring the torque from the first shaft to the second shaft, the activating assembly including;
a sliding cam;
a rotating cam;
an actuator that is electrically actuated, adapted to communicate with an electronic control that actuates the actuator, and is configured to selectively rotate the rotating cam relative to the sliding cam;
an engaging gear;
wherein the engaging gear is configured to be moved by the sliding cam between a first engaged position where the torque is transferred from the first shaft to the second shaft through the engaging gear and a second disengaged position where no torque is transferred to the second shaft;
wherein relative rotation between the rotating cam and the sliding cam moves the sliding cam thereby moving the engaging gear between the first engaged and second disengaged positions, wherein the actuator includes a motor that is coupled to the rotating cam, and wherein the sliding cam includes an engaging cam surface configured to engage a complementary engaging cam surface of the rotating cam, and the sliding cam includes a disengaging cam surface configured to engage a complementary disengaging cam surface of the rotating cam to move the sliding cam in response to relative rotation between the rotating cam and the sliding cam, and wherein the engaging cam surface and the disengaging cam surface of both the rotating cam and the sliding cam are arranged in the direction of rotation so that the rotating cam may be driven in one direction to move the engaging gear from the engaged position to the disengaged position and from the disengaged position to the engaged position.

18. A power transfer unit for use in a vehicle for transferring a torque, the power transfer unit comprising:
a first shaft configured to receive the torque from a vehicle transmission or a device connected directly to the vehicle transmission;
a second shaft configured to output the torque to a propshaft; and
an activating assembly for selectively transferring the torque from the first shaft to the second shaft, the activating assembly including;
a sliding cam that includes an engaging cam surface and a disengaging cam surface;
a rotating cam that includes an engaging cam surface and a disengaging cam surface that are configured to engage or be engaged by the engaging cam surface and the disengaging cam surface of the sliding cam to move the sliding cam through relative rotation between the rotating cam and the sliding caman actuator that is electrically actuated, adapted to communicate with an electronic control that actuates the actuator, and is configured to selectively rotate the rotating cam relative to the sliding cam;

an engaging gear;

wherein the engaging gear is configured to be moved by the sliding cam between a first engaged position where the torque is transferred from the first shaft to the second shaft through the engaging gear and a second disengaged position where no torque is transferred to the second shaft;

wherein relative rotation between the rotating cam and the sliding cam moves the sliding cam thereby moving the engaging gear between the first engaged and second disengaged positions, and wherein, for at least one of the sliding cam and the rotating cam, one of the engaging cam surface and the disengaging cam surface is inclined more steeply than the other cam surface relative to an axis about which the rotating cam rotates.

* * * * *

UNITED STATES PATENT AND TRADEMARK OFFICE
CERTIFICATE OF CORRECTION

| | |
|---|---|
| PATENT NO. | : 9,182,012 B2 |
| APPLICATION NO. | : 14/110371 |
| DATED | : November 10, 2015 |
| INVENTOR(S) | : Bernd Greiss et al. |

It is certified that error appears in the above-identified patent and that said Letters Patent is hereby corrected as shown below:

Claims:

In column 16, line 66, claim 18 after "sliding" delete "caman" and insert --cam, an--

Signed and Sealed this
Seventh Day of June, 2016

Michelle K. Lee
*Director of the United States Patent and Trademark Office*